(12) United States Patent
Yu et al.

(10) Patent No.: US 11,681,012 B2
(45) Date of Patent: Jun. 20, 2023

(54) FLEXIBLE RADAR SUPPORT FOR ABSORBING VIBRATION DEVIATION

(71) Applicants: Yanfeng Plastic Omnium Automotive Exterior Systems Co., Ltd., Shanghai (CN); Compagnie Plastic Omnium SE, Lyons (FR)

(72) Inventors: Xia Yu, Shanghai (CN); Quanquan Kong, Shanghai (CN); Miaotian Lin, Shanghai (CN)

(73) Assignees: Yanfeng Plastic Omnium Automotive Exterior Systems Co., Ltd., Shanghai (CN); Compagnie Plastic Omnium SE, Lyons (FR)

( * ) Notice: Subject to any disclaimer, the term of this patent is extended or adjusted under 35 U.S.C. 154(b) by 296 days.

(21) Appl. No.: 16/728,807

(22) Filed: Dec. 27, 2019

(65) Prior Publication Data

US 2021/0080538 A1   Mar. 18, 2021

(30) Foreign Application Priority Data

Sep. 17, 2019   (CN) .......................... 201921542129.X

(51) Int. Cl.
*G01S 7/03* (2006.01)
*G01S 13/93* (2020.01)
(Continued)

(52) U.S. Cl.
CPC ................ *G01S 7/032* (2013.01); *G01S 7/35* (2013.01); *G01S 13/93* (2013.01); *G01S 7/027* (2021.05);
(Continued)

(58) Field of Classification Search
CPC . G01S 7/027; G01S 7/032; G01S 7/35; G01S 13/93; G01S 2013/9327; G01S 2013/93275; G01S 13/931
See application file for complete search history.

(56) References Cited

U.S. PATENT DOCUMENTS

2014/0104049 A1\* 4/2014 Foss ...................... B60Q 1/525
340/435
2018/0236958 A1   8/2018 Horiuchi et al.
(Continued)

FOREIGN PATENT DOCUMENTS

FR   3 037 017 A1      9/2016
KR   20120051011 A  \*  5/2012  ............. E05F 15/73
KR   10-1879403 B1     7/2018

OTHER PUBLICATIONS

Extended European Search Report and Written Opinion dated Mar. 17, 2020 for Application No. 19219689.7.

*Primary Examiner* — Timothy A Brainard
*Assistant Examiner* — Ismaaeel A. Siddiquee
(74) *Attorney, Agent, or Firm* — Metis IP LLC

(57) ABSTRACT

A flexible radar support for absorbing vibration deviation comprises a support base and a support top cover that are engaged with each other in an interlocking manner. A housing space for arranging a radar is formed between the support base and the support top cover. The support base includes: a centrally arranged base center, and a base edge circumferentially arranged around the base center. The base edge and the base center are connected through four flexible structures that form U-shaped cantilever beams protruding towards the support top cover. With the flexible radar support provided, and with the design of U-shaped flexible structures, where an automobile body vibrates at a large amplitude, the flexible radar support can still absorb swaying in the up and down, and left and right directions during (Continued)

the course of driving, thereby reducing the impact of the automobile body's vibrations on the detection precision of a radar.

10 Claims, 4 Drawing Sheets

(51) Int. Cl.
    *G01S 7/35*         (2006.01)
    *G01S 7/02*         (2006.01)
    *G01S 13/931*      (2020.01)

(52) U.S. Cl.
    CPC ..... *G01S 13/931* (2013.01); *G01S 2013/9327* (2020.01); *G01S 2013/93275* (2020.01)

(56) References Cited

U.S. PATENT DOCUMENTS

2018/0347656 A1*  12/2018  Sailhamer ............... F16F 7/108
2019/0198986 A1*   6/2019  Singh .................. H01Q 1/3283

* cited by examiner

United States Patent US 11,681,012 B2

FLEXIBLE RADAR SUPPORT FOR ABSORBING VIBRATION DEVIATION

CROSS REFERENCE TO RELATED APPLICATION

This application claims priority to Chinese Application No. 201921542129.X filed Sep. 17, 2019, the entire disclosure of which is hereby incorporated by reference.

The invention relates to the field of radar support, and more particularly, to a flexible radar support that absorbs vibration deviation.

Currently, consumers of automobiles have higher and higher requirements for functions of an automobile. Various types of high-end radars are used more and more. Regarding bumpers, radars of various functions are integrated with a bumper, which not only enhances the functionality of the bumper, but also increases the value of the bumper. However, after a radar is integrated with a skin, during the course of driving, when unsmooth road conditions are encountered, vibrations of the skin will cause the radar to shake. Because the radars frequency bands used in automobiles are relatively high at this stage (for example, 77 GHz millimetre wave radar), it imposes relatively high requirements on the counterpart's stability. In particular regarding radars requiring high precision, during the course of driving, an automobile's vibrations have a certain impact on a radar's detection precision.

Currently, high-precision radars are mostly integrated in automobile body frame or grille regions. Those regions usually can provide a relatively stable positioning system for a radar. During the course of driving, the impact on the radar is relatively small, but this has certain limitation on the arrangement of the radar.

An objective of the invention is to provide a flexible radar support that absorbs vibration deviation, thus solving the problem in the prior art that the detection precision of a radar is affected by an automobile's vibrations.

To solve the above-described technical problem, the invention adopts the following technical solution:

A flexible radar support for absorbing vibration deviation is provided. It comprises a support base and a support top cover that are engaged with each other in an interlocking manner. A housing space for arranging a radar is formed between the support base and the support top cover. The support base comprises: a centrally arranged base center, and a base edge circumferentially arranged around the base center. The base edge and the base center are connected through four flexible structures that form U-shaped cantilever beams protruding towards the support top cover.

Preferably, the four U-shaped cantilever beams are symmetrically arranged in four directions of up, down, left, and right directions, respectively.

Preferably, four corner regions between the base edge and the base center are hollowed out and disconnected.

Preferably, first protruding tabs, extending towards the base edge and keeping spaced from the base edge, are arranged in the four corner regions of the base center. The first protruding tabs are provided with screw holes.

Preferably, second protruding tabs for cooperating with the first protruding tabs are arranged in four corner regions of the support top cover. The second protruding tabs are provided with screw holes.

Preferably, the support base and the support top cover are fastened to each other by self-tapping screws.

Preferably, the wall thickness of a side wall of the U-shaped cantilever beams is 2.0 mm to 3.0 mm.

Preferably, the wall thickness of the bent portion of the U-shaped cantilever beams is 1.0 mm to 2.0 mm.

Preferably, the radius of a round angle of a bent portion of the U-shaped cantilever beams is 3.5 mm to 4.5 mm.

Preferably, the angle formed by two side walls of the U-shaped cantilever beams is 40° to 50°.

With the flexible radar support provided by the invention, thanks to the design of U-shaped flexible structures, even in the situation where an automobile body vibrates at a large amplitude, the flexible radar support can still absorb swaying (shaking) in the up and down, and left and right directions during the course of driving, thereby reducing the impact of the automobile body's vibrations on the detection precision of a radar. Moreover, the flexible radar support can provide more choices for radar positions within the range of permitted arrangement for a radar, and at the same time enhances the functionality of a bumper.

The invention will be described further below in reference to specific embodiments. It should be understood that the embodiments below are used merely to describe the invention and not to limit the scope of the invention.

Figure 1:
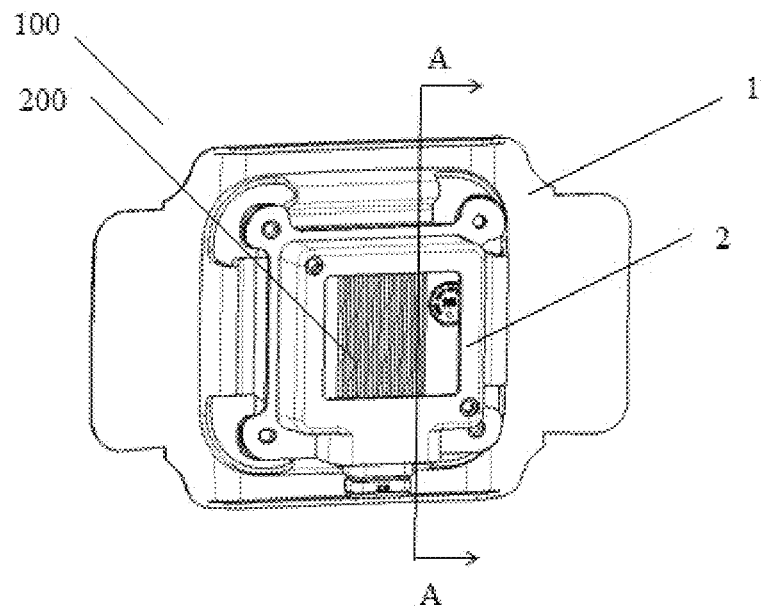
FIG. 1 is an overall assembled view of a flexible radar support in use state provided according to a preferred embodiment of the invention.
Figure 2:
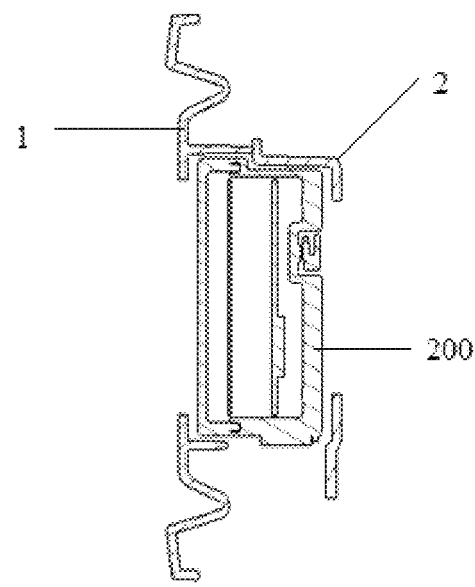
FIG. 2 is a sectional view of the structure shown in FIG. 1.

In reference to FIGS. 1 and 2, a schematic view of a flexible radar support 100 in use state provided according to a preferred embodiment of the invention is shown. The flexible radar support 100 comprises a support base 1 and a support top cover 2 that are engaged with each other in an interlocking manner. A radar 200 is arranged in a housing space formed between the support base 1 and the support top cover 2.

Figure 3:
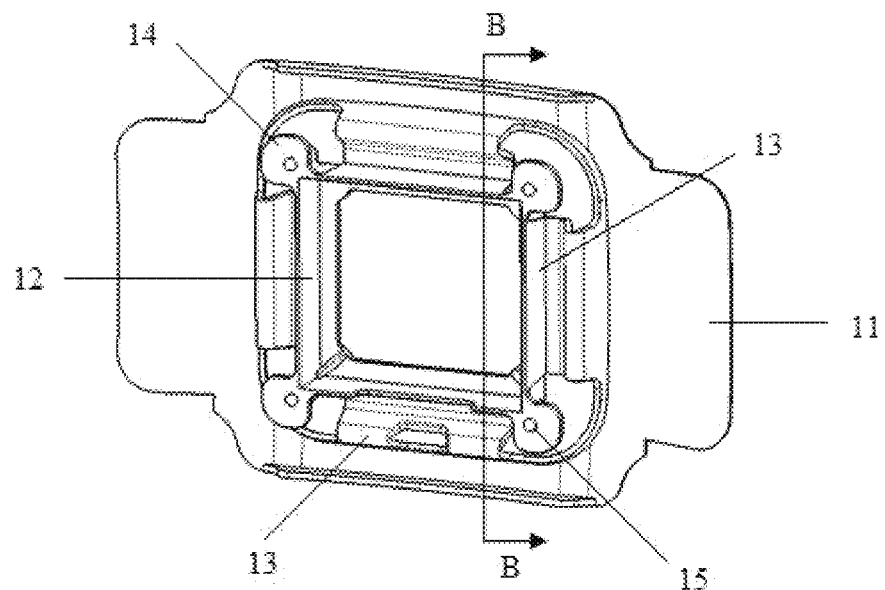
FIG. 3 is a structural diagram of the support base.
Figure 4:
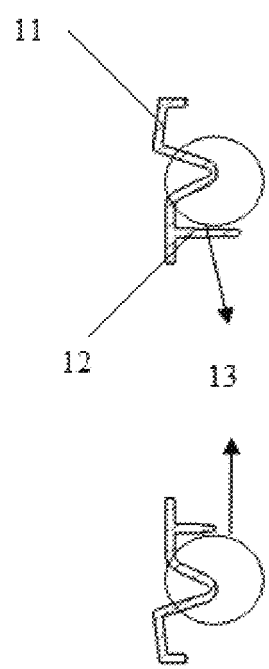
FIG. 4 is a sectional view of the support base shown in FIG. 3.

Specifically, in reference to FIGS. 3 and 4, the support base 1 comprises: a centrally arranged base center 12, and a base edge 11 provided circumferentially around the base center 12. The base edge 11 and the base center 12 are connected through four flexible structures that form U-shaped cantilever beams 13 protruding towards the support top cover 2. By providing the U-shaped cantilever beams 13, the flexible radar support 100 can absorb vibration deviations caused by an automobile body skin, reducing the impact of the skin's vibrations on the detection precision of the radar 200.

According to the preferred embodiment, the four U-shaped cantilever beams 13 are arranged symmetrically in the respective four—upward, downward, left, and right—directions. Four corner regions between the base edge 11 and the base center 12 are hollowed out and disconnected.

According to this preferred embodiment, first protruding tabs 14, extending towards the base edge 11 and keeping spaced from the base edge 11, are arranged in the four corner regions of the base center 12. The first protruding tabs 14 are provided with screw holes 15.

Figure 5:
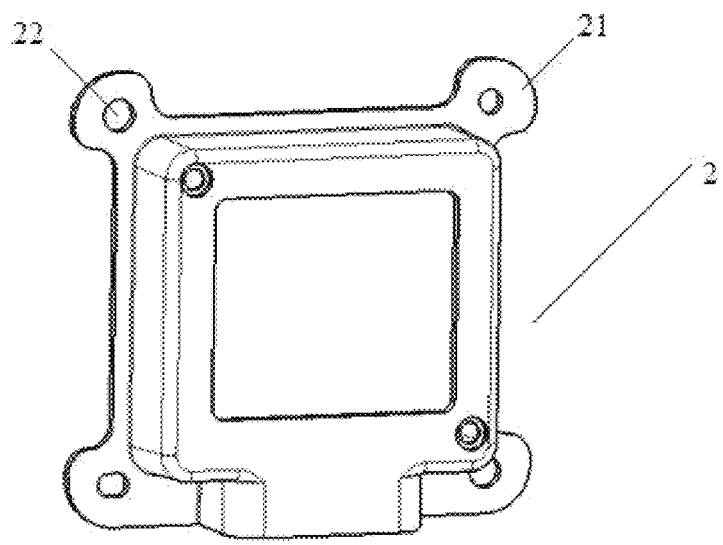
FIG. 5 is structural diagram of the support top cover.

As shown in FIG. 5, correspondingly, second protruding tabs 21 for cooperating with the first protruding tabs 14 are provided in the four corner regions of the support top cover 2. The second protruding tabs 21 are also provided with screw holes 22.

Therefore, according to this preferred embodiment, the fixing between the support base 1 and the support top cover 2 that engage with each other in an interlocking manner can be achieved by self-tapping screws that pass through the screw holes 22, 15 sequentially.

Figure 6:
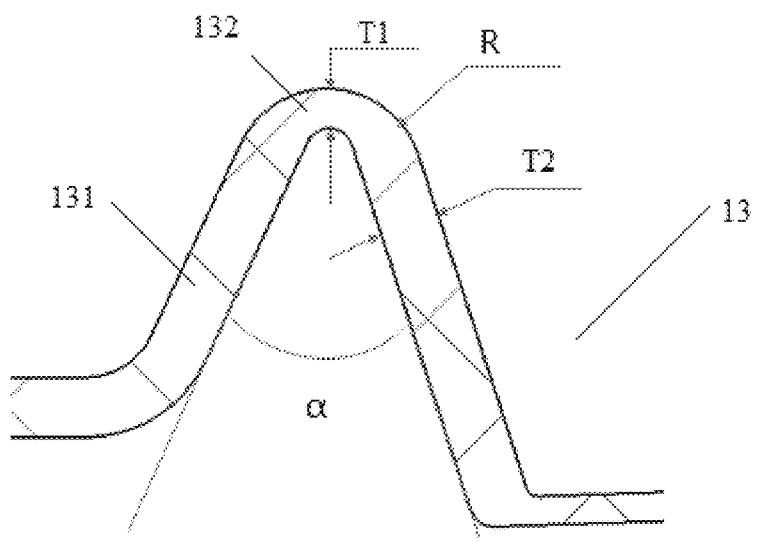
FIG. 6 is a schematic enlarged detailed view of a U-shaped cantilever beam on a support base.

According to the invention, as shown in FIG. 6, the wall thickness T1 of the bent portion 132 of the U-shaped cantilever beams 13 is preferably 1.0 mm to 2.0 mm.

The wall thickness T2 of the side wall 131 of the U-shaped cantilever beams 13 is preferably 2.0 mm to 3.0 mm.

The radius R of the round angle of the bent portion 132 of the U-shaped cantilever beams 13 is preferably 3.5 mm to 4.5 mm.

The angle α formed between the two side walls 131 of the U-shaped cantilever beams 13 is preferably 40° to 50°.

The "U"-shaped cantilever beams 13 can be adapted to different weights of the radar by changing the wall thickness, the angle formed between the two side walls, the size of the "U"-shape, and the kind of material.

According to this preferred embodiment, the wall thickness T1 of the bent portion 132 of the U-shaped cantilever beams 13 is 1.5 mm, the wall thickness T2 of the side wall 131 is 2.5 mm, the radius R of the round angle of the bent portion 132 is 4.0 mm, and the angle α formed by the two side walls 131 is 43°.

Figure 7:
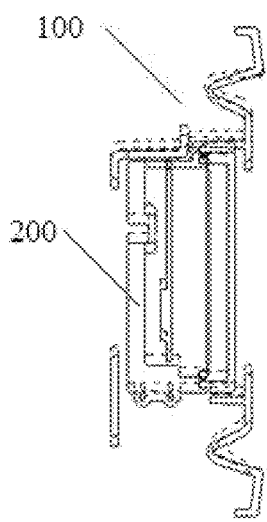
FIG. 7 is a schematic view of the states of the flexible radar support before and after deformation.

With the flexible radar support 100 provided according to the above-described preferred embodiment, when an automobile vibrates, thanks to the special design of the U-shaped cantilever beams 13, and the fact that the radar 200 itself has a certain weight, the flexible radar support 100 absorbs part of the vibrations by means of the weight of the radar itself and the flexibility of the U-shapes. During this process, as illustrated by the dotted line in FIG. 7, the flexible radar support 100 undergoes only slight deformation, thereby reducing to the maximum extent the impact of an automobile body's vibrations on the detection precision of a radar.

What has been described are merely preferred embodiments of the invention, and are not intended to limit the scope of the invention. The embodiments of the invention described above can be subject to various modifications. All simple, equivalent changes and embellishments made according to the claims and the contents of the specification of the present invention application fall within the scope of protection of the invention. What has not been described in detail in the invention is conventional technologies.

The invention claimed is:

1. A flexible radar support for absorbing vibration deviation, characterized in that, it comprises a support base and a support top cover that are engaged with each other in an interlocking manner, a housing space for arranging a radar being formed between the support base and the support top cover, the support base comprising: a centrally arranged base center, and a base edge circumferentially arranged around the base center, the base edge and the base center being connected through four flexible structures that form U-shaped cantilever beams protruding towards the support top cover, wherein the U-shaped cantilever beams protrude perpendicular to a main plane of the support base along a longitudinal direction.

2. The flexible radar support according to claim 1, wherein the four U-shaped cantilever beams are symmetrically arranged in four directions of up, down, left, and right directions, respectively.

3. The flexible radar support according to claim 1, wherein four corner regions between the base edge and the base center are hollowed out and disconnected.

4. The flexible radar support according to claim 3, wherein first protruding tabs, extending towards the base edge and keeping spaced from the base edge, are arranged in the four corner regions of the base center, the first protruding tabs being provided with screw holes.

5. The flexible radar support according to claim 4, wherein second protruding tabs for cooperating with the first protruding tabs are arranged in four corner regions of the support top cover, the second protruding tabs being provided with screw holes.

6. The flexible radar support according to claim 5, wherein the support base and the support top cover are fastened to each other by self-tapping screws.

7. The flexible radar support according to claim 1, wherein the wall thickness of a side wall of the U-shaped cantilever beams is 2.0 mm to 3.0 mm.

8. The flexible radar support according to claim 1, wherein the wall thickness of a bent portion of the U-shaped cantilever beams is 1.0 mm to 2.0 mm.

9. The flexible radar support according to claim 1, wherein the radius of a round angle of a bent portion of the U-shaped cantilever beams is 3.5 mm to 4.5 mm.

10. The flexible radar support according to claim 1, wherein the angle formed by two side walls of the U-shaped cantilever beams is 40° to 50°.

\* \* \* \* \*

UNITED STATES PATENT AND TRADEMARK OFFICE
CERTIFICATE OF CORRECTION

| | |
|---|---|
| PATENT NO. | : 11,681,012 B2 |
| APPLICATION NO. | : 16/728807 |
| DATED | : June 20, 2023 |
| INVENTOR(S) | : Xia Yu et al. |

It is certified that error appears in the above-identified patent and that said Letters Patent is hereby corrected as shown below:

On the Title Page

Item (71), Lines 3 to 4, "Compagnie Plastic Omnium SE, Lyons (FR)" should read -- Compagnie Plastic Omnium SE, Lyon (FR) --.

Item (73), Lines 3 to 4, "Compagnie Plastic Omnium SE, Lyons (FR)" should read -- Compagnie Plastic Omnium SE, Lyon (FR) --.

Signed and Sealed this
Eighth Day of August, 2023

Katherine Kelly Vidal
*Director of the United States Patent and Trademark Office*